Nov. 10, 1936.  J. C. FRYER  2,060,064
LETTER SCALE
Filed April 14, 1933
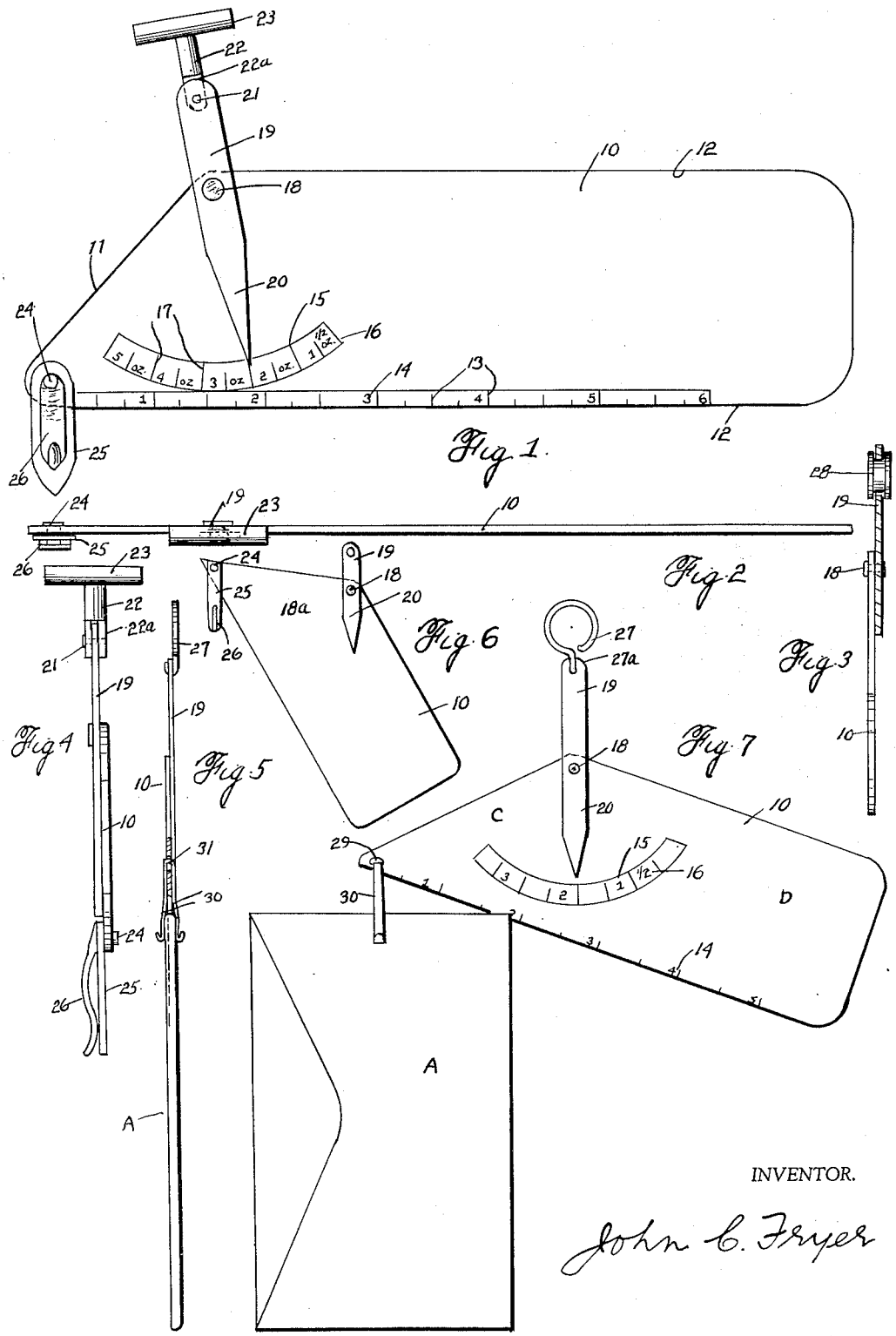
INVENTOR.
John C. Fryer Patented Nov. 10, 1936

2,060,064

UNITED STATES PATENT OFFICE 2,060,064

LETTER SCALE

John C. Fryer, Los Angeles, Calif.

Application April 14, 1933, Serial No. 666,148

1 Claim. (Cl. 265—61)

This invention relates to improvements in office appliances, and more particularly to means for weighing letters, and light objects in general.

One of the objects of this invention is to provide a simple, efficient, and inexpensive device designed for interchangeable use as a ruler, paper weight, and letter scale respectively.

Another object of this invention is to provide a flat-metal plate so shaped, designed and constructed as to permit of a piece as a convenient and readily accessible ruling instrument and weighing instrument combined to reduce the cost of manufacturing such devices.

A still further object of this invention is to provide a flat-metal ruler of a predominate weight and size designed to be held in the hand of the user for the purpose of removably attaching letters to be weighed upon, this ruler by counter balancing the weight of the ruler against that of the object to be weighed.

A further object of this invention is to provide a flat-metal plate with ruler calibrations thereof designed for measuring purposes, and with ounce weight calibrations designed for weighing letters and similar light objects, a suitable prop being provided upon which to suspend the plate, and the object to be weighed being suspended upon the plate so that by holding the prop in the hand of the user the weight of the plate may counterbalance that of the letter, indicating means on the plate revealing the exact weight measurement of the letter.

A further object of the invention is to provide a hand scale made serviceable as a measuring ruler and giving accurate measurements of the weight of any light object attached to it.

A final object of this invention is to provide a weighing and measuring instrument designed to suspend a calibrated plate of pre-determined weight eccentrically upon an indicating pointer carrying a handle, so as to enable this plate to swing relatively to the pointer so when the latter is held in a plumb line and a letter or light object is clamped on to or retained upon the plate laterally of the pointer the weight of the letter or object may be counterbalanced against the weight of the plate itself. A dial inscribed upon the plate swings with the plate relatively to the pointer so that when the plate comes to rest the pointer will indicate on the dial the exact weight in ounces or fraction of an ounce of the letter or object suspended upon the plate for weighing purposes.

With the above and other objects in view my invention consists in the combination, arrangement, and details of construction disclosed in the drawing and specifications, and then more particularly pointed out in the annexed claim.

In the drawing, wherein similar reference characters designate similar parts throughout the respective use, Figure 1 is a plan view of my invention, Figure 2 is an edge view thereof, Figure 3 is an end elevation, partly in section, of a modified form of my invention, Figure 4 is an end elevation of another form of my invention, Figure 5 is an end elevation, partly in section, of a still further form of my invention showing a letter applied for, Figure 6 is a side view of my invention showing the indicating pointer in proper position for suspending the weighing plate thereupon before a letter is attached to said plate, and, Figure 7 is a side elevation of my invention showing the correct position of all parts thereof for weighing a letter.

Referring to the drawing which, is merely illustrative of my invention 10 designates a flat sheet-metal plate of oblong shape having pre-determined weight, and it may be formed at one end with a diagonal edge 11 which joins a pair of relatively long-shorts parallel straight edges 12 extending longitudinally of the plate. The longer plate edge 12 of the plate 10 is provided with marks 13 calibrated in inches, which inches are successively designated by numerals as of 14.

It will be seen that the plate 10 is inscribed with a segmental dial 15 which may extend transversely across this plate, if desired. This dial can also be calibrated as of 17 and if printed with numerals and ounce abbreviations as at 16. There is a pivot pin 18 secured to the plate 10 at the summit of the diagonal edge 11, at a point which is concentric with the dial 15. Mounted so as to swing upon the pivot pin 18 as an indicating arm 19, terminating at its low end in a pointer 20 designed to sweep along the calibrations of the dial 15 or designed to have said dial calibrations move relatively thereto. The outer end of the indicator arm 18a into which is secured a pivot pin 21, upon which pin may be secured the lower bifurcated end 22a of a shank 22 carried by a cross handle 23, all as shown in Figure 1 and Figure 4. Another pivot pin 24 is attached at the apex end of the diagonal edge 11 at plate 10 and upon this pin will be freely suspended a paper clamp of a proved construction. For example one such form of clamp consists of the arm 25 pivoted at its inner end of pin 24, and carrying an S-shaped spring clamping tongue 26. Instead of this clamping device a different clamp could be employed as by providing a type of clothes pin shape clamp whose looped portion 31 is freely suspended in a hole 29 located at the apex end of the plate, so that the resilient side-arms 30 of this clamp may receive, snap onto, and hold the letter to be weighed upon the plate.

Instead of the handle 23 that carries the indicator arm 19 I contemplate using, if desired, a rivet 28 operatively and rotatably mounted in the outer end of the indicating arm 19 as shown in Figure 3 is á hole 19a thereof. Or I may employ a ring 27 carrying a hook 27a which is swingingly secured to the outer end of the indicating arm 19 as shown in Figure 7 and Figure 5. In operation when it is desired to attach a letter for weighing purposes, the user of the instrument takes hold of the letter A and attaches the same to the clamp which is freely suspended upon the pin 24 or hole 29 at the apex of the plate. Having done this he takes hold of the handle 23, or ring 27, or rivet or eyelet 28, as the case may be so as to suspend the plate and the letter upon the indicating arm 19; the combined weight of the plate and letter A will swing the arm 19 until it assumes a position where it is in a plumb line. Since the plate 10 is mounted eccentrically upon the pin 18 of the arm 19 the plate provides a minor portion of its length C on one side of the arm 19 and a major portion of its length D on the opposite side thereof. It will be found that the combined weight of the minor portion C of the plate 10 and that of the letter A suspended thereto will soon counterbalance the weight of the major portion D of this plate, causing the plate to swing accordingly until it comes into equilibrium and is at rest. As the plate swings so does its dial 15 so that when the plate comes to rest the pointer 20 will come opposite some calibration mark 17 of the dial 15 so that the exact weight in ounces or fraction of an ounce of the letter A may be instantly read accurately. The letter may then be detached from the clamp and the instrument is ready for re-use. It will also be seen that the ruler edge 12 of the plate 10 may be laid flat upon a sheet of paper to allow a pencil point to trace a straight line thereagainst. I do not limit myself to the exact details of construction disclosed herein but claim all variations covered in the annexed claim.

What I claim and seek to protect by Letters Patent is:—

A letter weighing scale comprising an oblong plate having a transverse edge at one end disposed diagonally of its longitudinal axis, a letter carrying means mounted suspendingly at the apex corner of the plate made by said diagonal edge, a pivot pin mounted at the obtuse corner of the plate made by said transverse edge, a rectilinear pointer fulcrumed medially upon said pivot pin so that its upper portion projects a substantial distance above the obtuse corner of the plate, said plate bearing an arcuate series of designated calibrations concentric with said pivot pin the lower pointed end of which pointer is designed to sweep past said calibrations as the plate swings on the pivot between said pointer and said plate, and manually engageable handle pivotally connected to the projecting upper end of said pointer.

JOHN C. FRYER.